United States Patent
Agarwal et al.

(10) Patent No.: US 9,990,610 B2
(45) Date of Patent: Jun. 5, 2018

(54) SYSTEMS AND METHODS FOR PROVIDING SUGGESTED REMINDERS

(71) Applicant: GOOGLE INC., Mountain View, CA (US)

(72) Inventors: Shalini Agarwal, San Francisco, CA (US); Amarnag Subramanya, Sunnyvale, CA (US); Edgar Gonzalez Pellicer, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 195 days.

(21) Appl. No.: 14/473,590

(22) Filed: Aug. 29, 2014

(65) Prior Publication Data

US 2016/0062605 A1 Mar. 3, 2016

(51) Int. Cl.
*G06F 3/0484* (2013.01)
*G06F 3/0482* (2013.01)
*G06Q 10/10* (2012.01)
*G06F 17/24* (2006.01)

(52) U.S. Cl.
CPC ......... *G06Q 10/107* (2013.01); *G06F 17/241* (2013.01)

(58) Field of Classification Search
CPC . G06F 3/04842; G06F 3/04847; G06F 3/0482
USPC ........................ 715/752, 841, 843
See application file for complete search history.

(56) References Cited

U.S. PATENT DOCUMENTS

| | | | | |
|---|---|---|---|---|
| 6,272,532 | B1* | 8/2001 | Feinleib | G06Q 10/107 709/206 |
| 7,231,375 | B2 | 6/2007 | Ratnaparkhi et al. | |
| 2002/0087534 | A1* | 7/2002 | Blackman | G06Q 10/10 |
| 2003/0063135 | A1* | 4/2003 | Liu | G06F 19/3406 715/864 |
| 2003/0097361 | A1* | 5/2003 | Huang | G06F 17/30861 |
| 2005/0039141 | A1* | 2/2005 | Burke | G06F 3/0482 715/810 |
| 2005/0076037 | A1* | 4/2005 | Shen | G06Q 10/107 |
| 2005/0114778 | A1* | 5/2005 | Branson | G06F 9/4446 715/711 |
| 2005/0138552 | A1* | 6/2005 | Venolia | G06Q 10/107 715/273 |
| 2005/0160465 | A1* | 7/2005 | Walker | H04N 5/76 725/86 |

(Continued)

FOREIGN PATENT DOCUMENTS

WO WO03/058519 A2 7/2003

*Primary Examiner* — Daeho D Song
(74) *Attorney, Agent, or Firm* — Morgan, Lewis & Bockius LLP

(57) ABSTRACT

A method for annotating a message executes at a computing device having one or more processors and memory. The memory stores one or more programs configured for execution by the one or more processors. A plurality of messages for a user is analyzed to determine whether a task reminder is derivable for any of the messages. In this way, task reminders are derived for at least a subset of the messages. A user interface for an electronic messaging application is provided. The interface includes a list of objects, one or more of which represents a collapsed state of a message in the message subset and comprises a summary, task reminder, and a dismissal affordance. Responsive dismissal affordance selection, the task reminder and the dismissal affordances are removed from the object.

21 Claims, 14 Drawing Sheets

(56) References Cited

U.S. PATENT DOCUMENTS

| | | | |
|---|---|---|---|
| 2006/0064316 A1* | 3/2006 | Wallace | G06Q 10/063 705/7.11 |
| 2006/0168025 A1* | 7/2006 | Jain | H04L 51/066 709/206 |
| 2006/0190966 A1* | 8/2006 | McKissick | G06Q 30/02 725/61 |
| 2007/0067196 A1 | 3/2007 | Usui | |
| 2007/0124400 A1* | 5/2007 | Lee | G06F 21/604 709/206 |
| 2007/0229517 A1* | 10/2007 | May | G06Q 10/109 345/501 |
| 2007/0230282 A1* | 10/2007 | May | G04G 11/00 368/29 |
| 2007/0282956 A1* | 12/2007 | Staats | G06Q 10/107 709/206 |
| 2008/0082678 A1* | 4/2008 | Lorch | H04M 1/72555 709/230 |
| 2009/0037530 A1* | 2/2009 | Bennetts | H04N 7/147 709/204 |
| 2009/0077168 A1* | 3/2009 | Sadasue | G06F 17/3028 709/203 |
| 2009/0119678 A1* | 5/2009 | Shih | G06Q 10/10 719/313 |
| 2009/0249247 A1* | 10/2009 | Tseng | H04M 1/72552 715/808 |
| 2009/0319911 A1* | 12/2009 | McCann | G06Q 10/107 715/752 |
| 2010/0026526 A1* | 2/2010 | Yokota | G08G 1/096827 340/996 |
| 2010/0033433 A1* | 2/2010 | Utz | G06F 1/1616 345/168 |
| 2010/0042690 A1* | 2/2010 | Wall | G06Q 10/107 709/206 |
| 2010/0246791 A1* | 9/2010 | Wang | H04M 3/42195 379/201.02 |
| 2011/0124323 A1* | 5/2011 | Selph | H04M 1/645 455/415 |
| 2011/0154338 A1 | 6/2011 | Ramanathaiah et al. | |
| 2012/0311585 A1* | 12/2012 | Gruber | H04W 4/02 718/100 |
| 2013/0110940 A1* | 5/2013 | Pasquero | H04M 1/72552 709/206 |
| 2013/0125063 A1* | 5/2013 | Lee | G06F 3/04883 715/854 |
| 2014/0135036 A1* | 5/2014 | Bonanni | H04W 4/023 455/456.3 |
| 2015/0212701 A1* | 7/2015 | Rodney | G06F 3/04842 715/771 |

* cited by examiner

SYSTEMS AND METHODS FOR PROVIDING SUGGESTED REMINDERS

TECHNICAL FIELD

The disclosure relates generally to electronic messaging applications, and more specifically to annotating a message.

BACKGROUND

Electronic messaging applications, such as email, convey various types of information to a recipient such as messages to and from various others. Some messages include a task that the recipient must perform. However, to identify a task in a message, it is necessary to perform several actions. First, the message is reviewed and, if there is a task somewhere in the message, the task is identified and characterized. Next, in order to ensure that the task is not simply forgotten, it is best to annotate the message in some way to indicate that there is a task in the message. For instance, to add a task reminder to the message that includes the task. What are needed in the art are systems and methods for assisting a recipient with identifying such tasks and annotating messages accordingly.

SUMMARY

Disclosed implementations address the above deficiencies and other problems associated with performing tasks. The disclosed implementations provide ways to help annotate messages. In accordance with some implementations, a method of annotating a message executes at a computing device having one or more processors and memory. The memory stores one or more programs configured for execution by the one or more processors. A plurality of messages intended for a user is analyzed to determine whether a task reminder is derivable from respective messages in the plurality of messages (e.g., through natural language processing of the respective messages), thereby deriving task reminders for at least a subset of the plurality of messages. In some embodiments, the task reminder includes one or more words that are taken from a source independent of the respective message and one or more words that are taken from the respective message. In some embodiments, the task reminder is taken or derived exclusively from the respective message.

A user interface is provided for an electronic messaging application. The user interface includes a list of objects. In some instances, an object in the list of objects represents a plurality of messages with a common topic. In some embodiments, each object in the list of objects is one of a task, a message, or a plurality of messages.

One or more respective object of the objects in the list of objects represents a collapsed state of a corresponding message in the subset of the plurality of messages. Each such respective object comprises: (i) a message summary for the corresponding message, (ii) the task reminder derived from the corresponding message, (iii) optionally, a confirmation affordance (e.g., check box, radio button, etc.), and (iv) a dismissal affordance. In some embodiments that include the optional confirmation affordance, the confirmation affordance and the dismissal affordance occupy different portions of the respective object. For instance, each affordance is an independent check box, radio button, etc. In other embodiments that include the optional confirmation affordance, the confirmation affordance and the dismissal affordance are different states of a single affordance that occupies a single portion of the respective object. For example, different states of a toggle button.

In embodiments that include the optional confirmation affordance, responsive to user selection of the confirmation affordance, the confirmation affordance and the dismissal affordance are removed from the respective object. Responsive to user selection of the dismissal affordance, the task reminder, the confirmation affordance (if present), and the dismissal affordance are removed from the respective object. Advantageously, in this way, a user can peruse suggested task reminders that have been identified for messages and confirm whether or not such reminders should be associated with the messages.

In some embodiments, the suggested task reminders are editable or customizable by the user. For instance, in one such embodiment, responsive to user selection of a task reminder of an object in the list of objects, the collapsed state of the message corresponding to the object is replaced with an expanded state of the corresponding message. In some instances this is done in a seamless fashion by pushing any objects in the list of objects that are above the object representing the corresponding message up and pushing any objects in the list of objects that are below the object representing the corresponding message down in the user interface. Further, the optional confirmation affordance (if present) and the dismissal affordance are removed and user editing of the task reminder is facilitated, thereby creating a task for the message. In some embodiments, the corresponding message is part of a chain of messages and the expanded state of the message includes the chain of messages. In some embodiments, the method further comprises providing a save affordance when the user edits the task reminder and, responsive to user selection of the save affordance, the expanded state of the corresponding message is replaced with the collapsed state of the corresponding message by pushing any objects in the list of objects that are above the object representing the message down and pushing any objects in the list of objects that are below the object representing the message up in the user interface. In so doing, the save affordance is removed.

In some embodiments the processing of a respective message in the plurality of messages comprises determining, for each respective predefined candidate task reminder in a plurality of predefined task reminders, whether there is a match between the predefined candidate task reminder and all or a portion of the respective message. When a match between respective predefined candidate task reminder and all or a portion of the respective message is found, the respective predefined candidate task reminder is deemed to be the task reminder for the respective message. In some embodiments, the match between the predefined candidate task reminder and all or a portion of the respective message includes natural language processing of the all or a portion of the respective message. In some embodiments, a predefined candidate task reminder in the plurality of candidate task reminders is provided by the user. In some embodiments, a predefined candidate task reminder in the plurality of candidate task reminders is from a source independent of the user.

Another aspect of the present disclosure provides a computing device comprising one or more processors, memory, and one or more programs stored in the memory. The one or more programs are configured for execution by the one or more processors. The one or more programs comprise instructions for analyzing a plurality of messages intended for a user to determine whether a task reminder is derivable from respective messages in the plurality of messages through processing of the respective messages, thereby deriving task reminders for at least a subset of the plurality of messages. A user interface for an electronic messaging application is provided. The user interface includes a list of objects, one or more respective object of the objects in the list of objects representing a collapsed state of a corresponding message in the subset of the plurality of messages and comprising message summary for the corresponding message, the task reminder, a dismissal affordance, and optionally, a confirmation affordance. In embodiments that include the optional confirmation affordance, responsive to user selection of the confirmation affordance, the confirmation affordance and the dismissal affordance are removed from the respective object. Responsive to user selection of the dismissal affordance, the task reminder, the optional confirmation affordance (if present), and the dismissal affordance are removed from the respective object.

Another aspect of the present disclosure provides a non-transitory computer readable storage medium storing one or more programs configured for execution by a computing device having one or more processors and memory. The one or more programs comprise instructions for analyzing a plurality of messages intended for a user to determine whether a task reminder is derivable from respective messages in the plurality of messages (e.g., through natural language processing of the respective messages), thereby deriving task reminder for at least a subset of the plurality of messages. A user interface for an electronic messaging application is provided. The user interface includes a list of objects, one or more respective object of the objects in the list of objects representing a collapsed state of a corresponding message in the subset of the plurality of messages and comprising message summary for the corresponding message, the task reminder, a dismissal affordance and, optionally, a confirmation affordance. In those embodiments that include the optional confirmation affordance, responsive to user selection of the confirmation affordance, the confirmation affordance and the dismissal affordance are removed from the respective object. Responsive to user selection of the dismissal affordance, the task reminder, the optional confirmation affordance (when present), and the dismissal affordance are removed from the respective object.

BRIEF DESCRIPTION OF THE DRAWINGS

For a better understanding of the aforementioned implementations of the invention as well as additional implementations thereof, reference should be made to the Description of Implementations below, in conjunction with the following drawings in which like reference numerals refer to corresponding parts throughout the figures.

Reference will now be made in detail to implementations, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details.

DESCRIPTION OF IMPLEMENTATIONS

Figure 1:
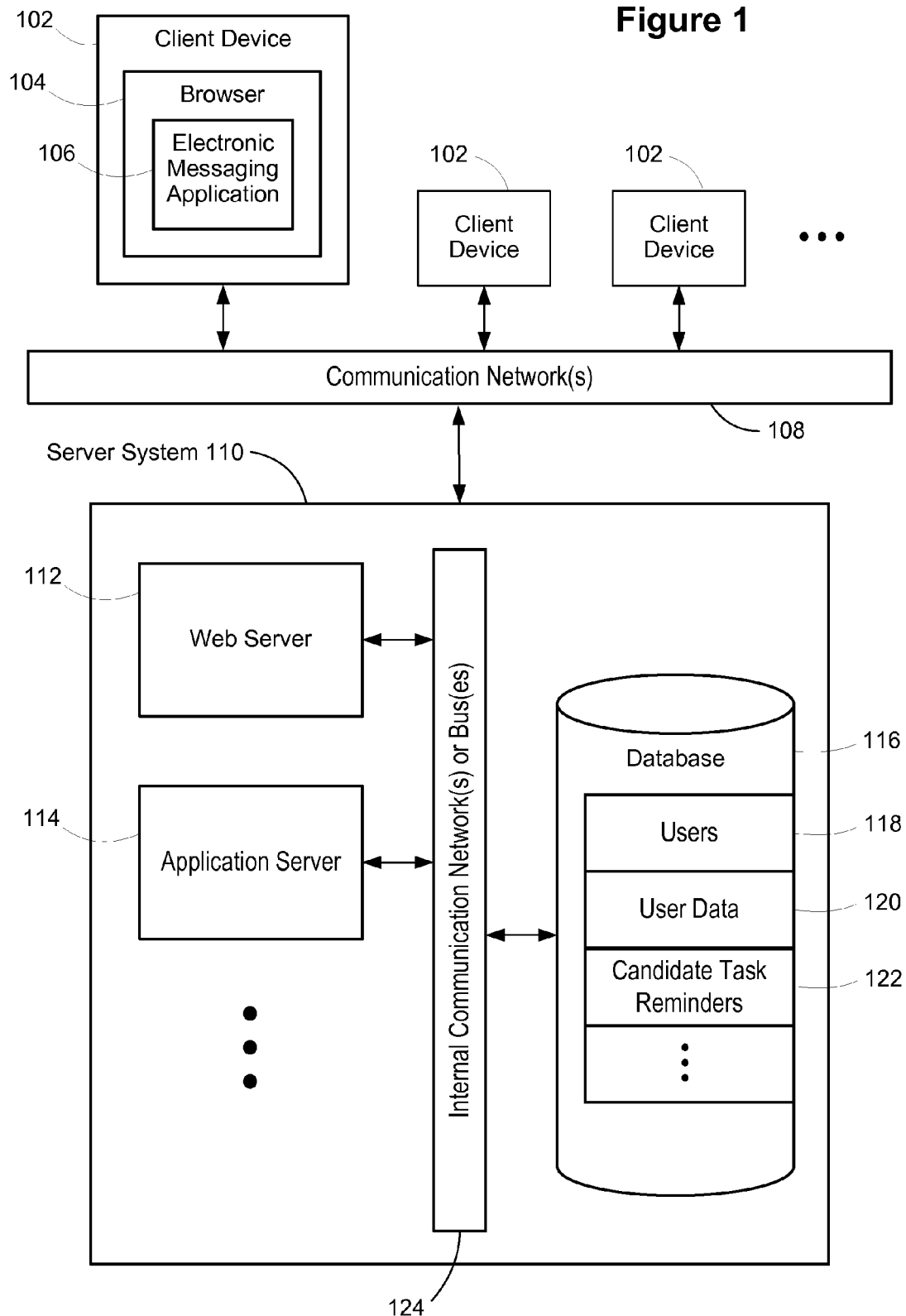
FIG. 1 illustrates a context in which some implementations operate.

FIG. 1 is a block diagram that illustrates the major components of some implementations. The various client devices 102 (also identified herein as computing devices) and servers 300 in a server system 110 communicate over one or more networks 108 (such as the Internet). A client device 102 may be a smart phone, a tablet computer, a laptop computer, a mobile computing device, a computing device of a vehicle of the user (e.g., an in-vehicle communications system, an in-vehicle entertainment system, an in-vehicle navigation system), a wearable apparatus of the user that includes a computing device (e.g., a watch of the user having a computing device, glasses of the user having a computing device, a wearable music player), desktop computer, or other computing device that has access to a communication network 108 and can run an electronic messaging application 106. In some implementations, the messaging application runs within a web browser 104.

In some implementations, the server system 110 consists of a single server 300. More commonly, the server system 110 includes a plurality of servers 300. In some implementations, the servers 300 are connected by an internal communication network of bus 124. The server system 110 includes one or more web servers 112, which receive requests from users (e.g., from client devices 102) and return appropriate information, resources, links, and so on. In some implementations, the server system 110 includes one or more application servers 114, which provide various applications, such as an electronic messaging application 106. The server system 110 typically includes one or more databases 116, which store information such as web pages, a user list 118, various user information 120 (e.g., user names and encrypted passwords, user preferences, and so on), and a plurality of predefined candidate task reminders 122.

Figure 2:
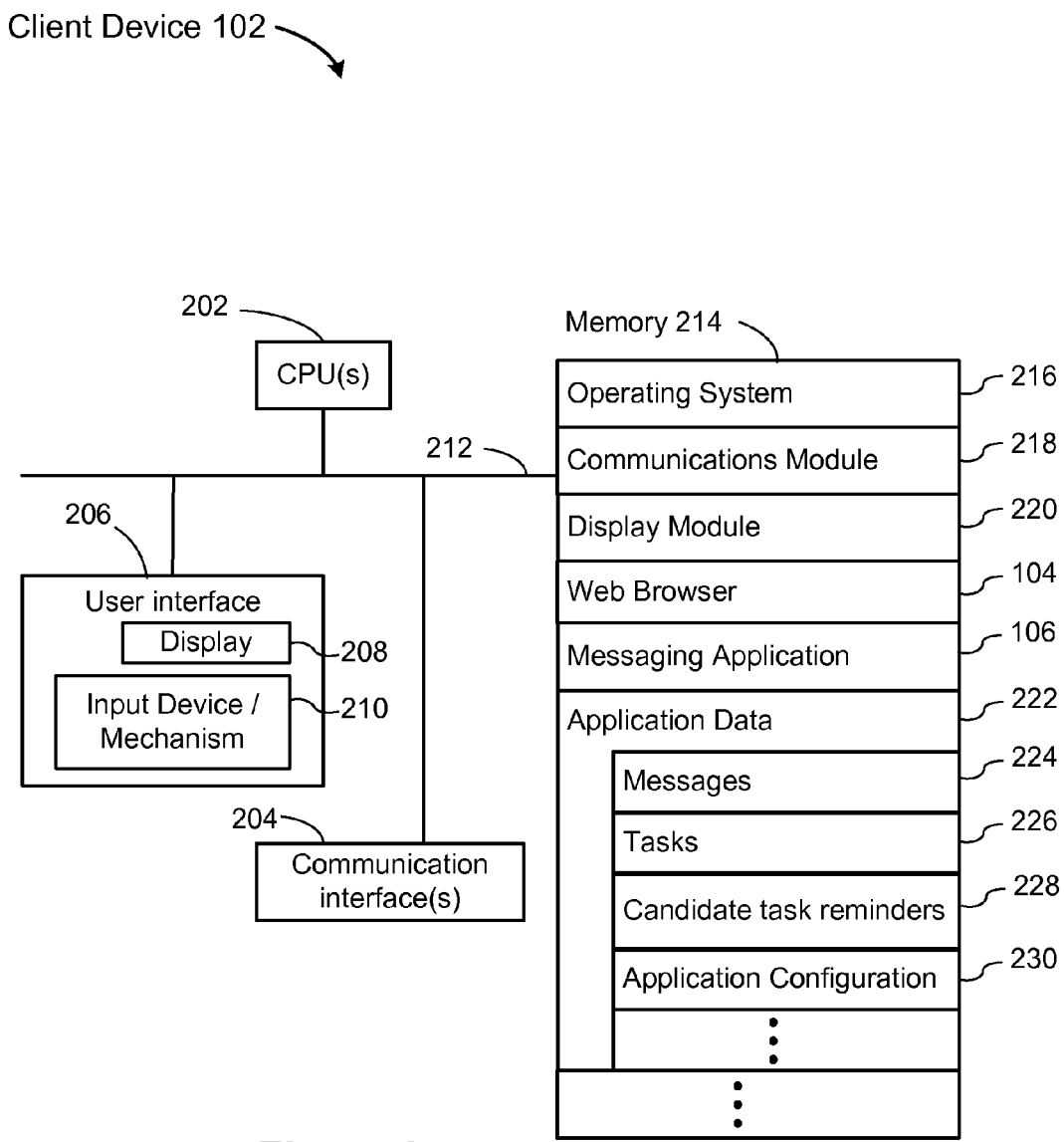
FIG. 2 is a block diagram of a client computing device according to some implementations.

FIG. 2 is a block diagram illustrating a client device 102 that a user uses to access an electronic messaging application 106. A client device is also referred to as a computing device, which may be a tablet computer, a laptop computer, a smart phone, a desktop computer, a PDA, or other computing device than can run an electronic messaging application 106 and has access to a communication network 108. A client device 102 typically includes one or more processing units (CPUs) 202 for executing modules, programs, or instructions stored in memory 214 and thereby performing processing operations; one or more network or other communications interfaces 204; memory 214; and one or more communication buses 212 for interconnecting these components. The communication buses 212 may include circuitry (sometimes called a chipset) that interconnects and controls communications between system components. A client device 102 includes a user interface 206 comprising a display device 208 and one or more input devices or mechanisms 210. In some implementations, the input device/mechanism includes a keyboard and a mouse; in some implementations, the input device/mechanism includes a "soft" keyboard, which is displayed as needed on the display device 208, enabling a user to "press keys" that appear on the display 208.

In some implementations, the memory 214 includes high-speed random access memory, such as DRAM, SRAM, DDR RAM or other random access solid state memory devices. In some implementations, memory 214 includes non-volatile memory, such as one or more magnetic disk storage devices, optical disk storage devices, flash memory devices, or other non-volatile solid state storage devices. In some implementations, the memory 214 includes one or more storage devices remotely located from the CPU(s) 202. The memory 214, or alternately the non-volatile memory device(s) within memory 214, comprises a non-transitory computer readable storage medium. In some implementations, the memory 214, or the computer readable storage medium of memory 214, stores the following programs, modules, and data structures, or a subset thereof:

- an operating system 216, which includes procedures for handling various basic system services and for performing hardware dependent tasks;
- a communications module 218, which is used for connecting the client device 102 to other computers and devices via the one or more communication network interfaces 204 (wired or wireless) and one or more communication networks 108, such as the Internet, other wide area networks, local area networks, metropolitan area networks, and so on;
- a display module 220, which receives input from the one or more input devices 210, and generates user interface elements for display on the display device 208;
- a web browser 104, which enables a user to communicate over a network 108 (such as the Internet) with remote computers or devices;
- an electronic messaging application 106, which enables the user to send and receive electronic messages. In some implementations, the electronic messaging application is an email application. In some implementations, the electronic messaging application is an instant messaging application. In some implementations, the electronic messaging application 106 runs within the web browser 104 as illustrated in FIG. 1. In some implementations, the electronic messaging application 106 runs independently of a web browser 104 (e.g., a desktop application). An example of an electronic messaging application is illustrated below in FIGS. 4A-4H; and
- application data 222, which is used by the electronic messaging application 106. The application data comprises messages 224 (e.g., email messages or instant messages) as well as tasks 226, and predefined candidate task reminders 228 for completing tasks. In some embodiments a task 226 is associated with a message 224. In some embodiments a task 226 is independent of all messages. In some embodiments, the application data 222 includes configuration data 230, such as user preferences, user history, geographic information about the user, or the state of configuration options.

Each of the above identified executable modules, applications, or sets of procedures may be stored in one or more of the previously mentioned memory devices and corresponds to a set of instructions for performing a function described above. The above identified modules or programs (e.g., sets of instructions) need not be implemented as separate software programs, procedures, or modules, and thus various subsets of these modules may be combined or otherwise re-arranged in various implementations. In some implementations, the memory 214 stores a subset of the modules and data structures identified above. Furthermore, in some embodiments, the memory 214 stores additional modules or data structures not described above.

Although FIG. 2 shows a client device 102, FIG. 2 is intended more as a functional description of the various features that may be present rather than as a structural schematic of the implementations described herein. In practice, and as recognized by those of ordinary skill in the art, items shown separately could be combined and some items could be separated.

Figure 3:
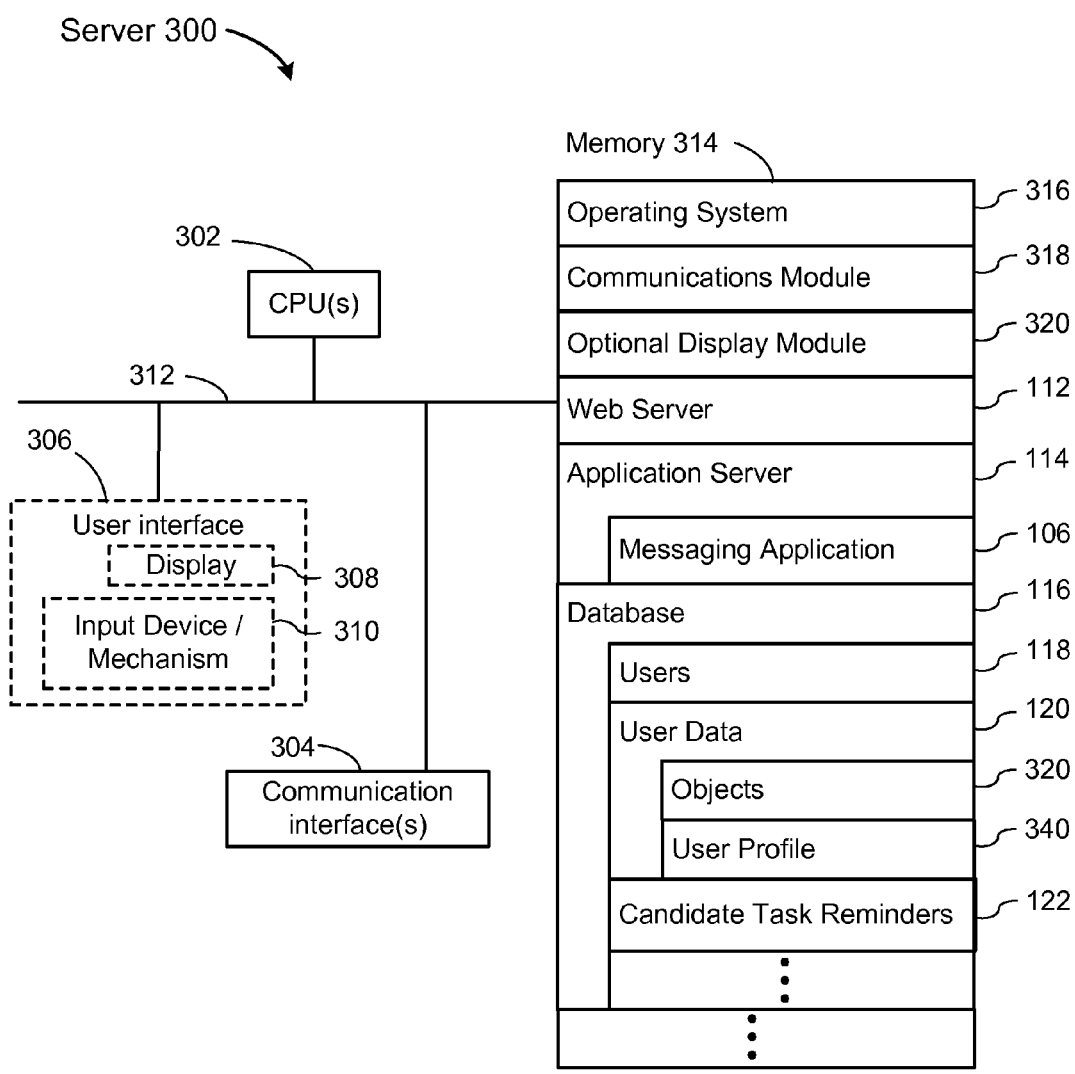
FIG. 3 is a block diagram of a server according to some implementations.

FIG. 3 is a block diagram illustrating a server 300 that is used in a server system 110 in accordance with some embodiments. A typical server system includes many individual servers 300, which, in some instances, number in the hundreds or thousands. A server 300 typically includes one or more processing units (CPUs) 302 for executing modules, programs, or instructions stored in the memory 314 and thereby performing processing operations; one or more network or other communications interfaces 304; memory 314; and one or more communication buses 312 for interconnecting these components. In some embodiments, the communication buses 312 include circuitry (sometimes called a chipset) that interconnects and controls communications between system components. In some implementations, a server 300 includes a user interface 306, which may include a display device 308 and one or more input devices 310, such as a keyboard and a mouse.

In some implementations, the memory 314 includes high-speed random access memory, such as DRAM, SRAM, DDR RAM or other random access solid state memory devices. In some implementations, the memory 314 includes non-volatile memory, such as one or more magnetic disk storage devices, optical disk storage devices, flash memory devices, or other non-volatile solid state storage devices. In some implementations, the memory 314 includes one or more storage devices remotely located from the CPU(s) 302. The memory 314, or alternately the non-volatile memory device(s) within memory 314, comprises a non-transitory computer readable storage medium. In some implementations, the memory 314, or the computer readable storage medium of memory 314, stores the following programs, modules, and data structures, or a subset thereof:

- an operating system 316, which includes procedures for handling various basic system services and for performing hardware dependent tasks;
- a communications module 318, which is used for connecting the server 300 to other computers via the one or more communication network interfaces 304 (wired or wireless), an internal network or bus 124, or other communication networks 108, such as the Internet, other wide area networks, local area networks, metropolitan area networks, and so on;
- an optional display module 320, which receives input from one or more input devices 310, and generates user interface elements for display on a display device 308;
- one or more web servers 112, which receive requests from client device 102, and returns responsive web pages, resources, or links. In some implementations, each request is logged in the database 116;
- one or more application servers 114, which provide various applications (such as an email or other electronic messaging application) to client devices 102. In some instances, applications are provided as a set of web pages, which are delivered to client devices 102 and displayed in a web browser 104. The web pages are delivered as needed or requested. In some instances, an application is delivered to a client device 102 as a download, which is installed and run from the client device 102 outside of a web browser 104;
- one or more databases 116, which store various data used by the modules or programs identified above. In some implementations, the database 116 includes a list of authorized users (e.g., including user names, encrypted passwords, and other relevant information about each user). The database 116 also stores user specific data 120 that is used by one or more of the applications provided by the application server. For example, some implementations store the electronic messages 224 for each user. For example, some implementations store objects 320 for each user. As another example, some implementations store user profiles 340 associated with users. In some implementations, the database 116 includes predefined candidate task reminders 122.

Candidate task reminders 122 and/or 228 are in any form suitable for reminding a user of a task. Moreover, it will be appreciated that FIGS. 2 and 3 collectively represent the server 300 and the client device 102 as including predefined candidate task reminders. In some implementations, only the server 300 stores predefined candidate task reminders. In some implementations, only the client device 102 stores predefined candidate task reminders. In some implementations, both the server 300 and the client device 102 store predefined candidate task reminders. In some such implementations, the server 300 and the client device 102 store the same predefined candidate task reminders. In some such implementations, the server 300 stores a first set of predefined candidate task reminders and the client device 102 stores a second set of predefined candidate task reminders, and there is no overlap between the first set of predefined candidate task reminders and the second set of predefined candidate task reminders, partial overlap between the first set of predefined candidate task reminders and the second set of predefined candidate task reminders, or complete overlap between the predefined candidate task reminders and the second set of predefined candidate task reminders. In one embodiment, the first set of predefined candidate task reminders is defined by a source independent of the user, and the second set of predefined candidate task reminders is defined by a particular user associated with a particular client device 102.

Each of the above identified elements in FIG. 3 may be stored in one or more of the previously mentioned memory devices. Each executable program, module, or procedure corresponds to a set of instructions for performing a function described above. The above identified modules or programs (e.g., sets of instructions) need not be implemented as separate software programs, procedures or modules, and thus various subsets of these modules are combined or otherwise re-arranged in various implementations. In some implementations, the memory 314 stores a subset of the modules and data structures identified above. Furthermore, in some embodiments, the memory 314 stores additional modules or data structures not described above.

Although FIG. 3 illustrates a server 300, FIG. 3 is intended more as functional illustration of the various features that may be present in a set of one or more servers rather than as a structural schematic of the implementations described herein. In practice, and as recognized by those of ordinary skill in the art, items shown separately could be combined and some items could be separated. The actual number of servers used to implement these features, and how features are allocated among them, will vary from one implementation to another, and depends in part on the amount of data traffic that the system must handle during peak usage periods as well as during average usage periods.

As illustrated in FIGS. 2 and 3, the functionality for an electronic messaging application may be shared between a client device 102 and a server system 110. In some implementations, after the electronic messaging application is installed on a client device 102, the majority of the subsequent processing occurs on the client device. In other implementations, the majority of the processing and data storage occurs at a server 300, and the client device 102 uses a web browser 104 to view and interact with the data. One of skill in the art recognizes that various allocations of functionality between the client device 102 and the server system 110 are possible, and some implementations support multiple configurations (e.g., based on user selection).

Figure 4A:
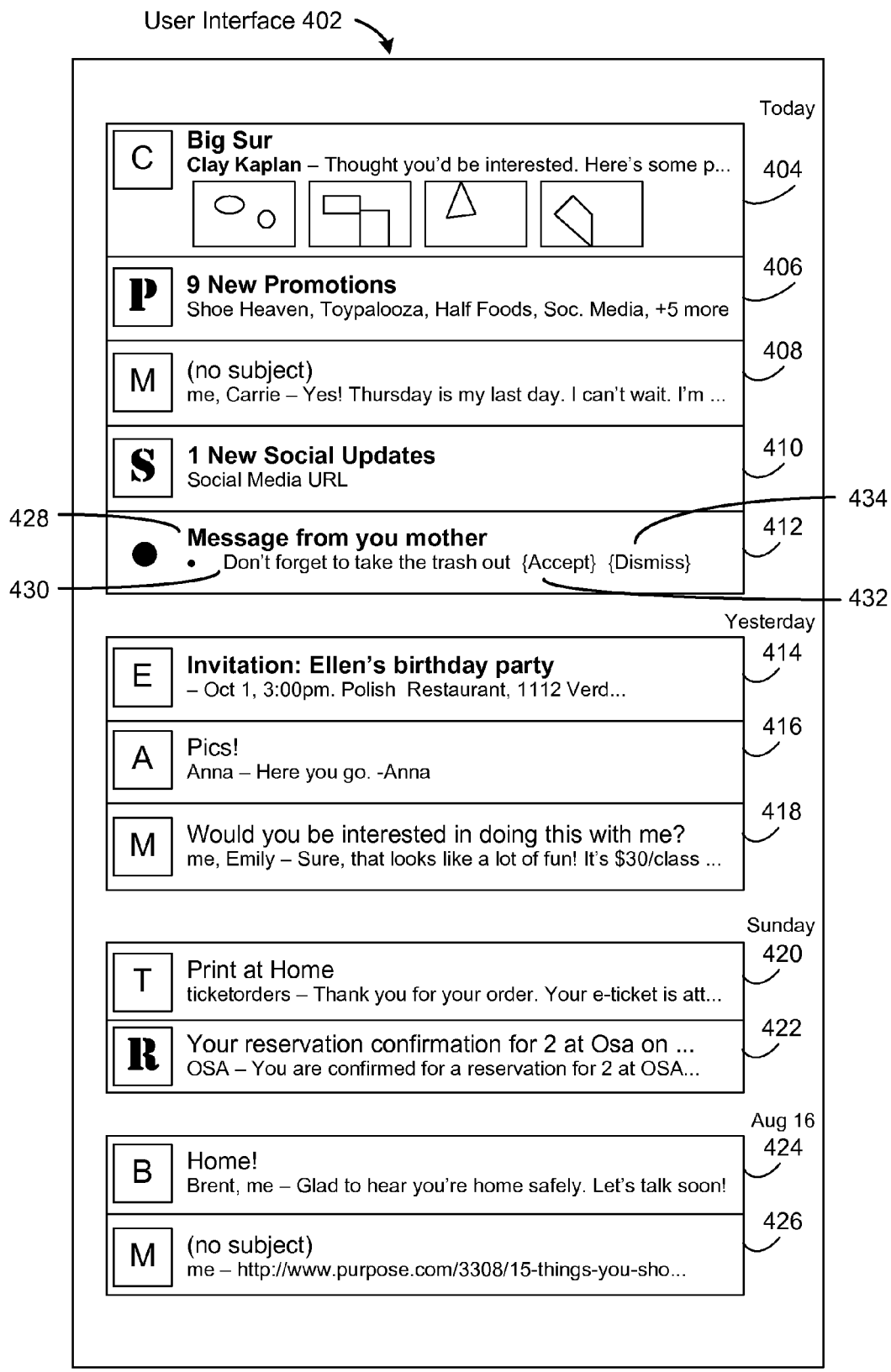
FIGS. 4A-4H illustrate aspects of a user interface for annotating a message in accordance with some implementations.

FIG. 4A illustrates features of an electronic messaging application that supports annotating a message in accordance with some implementations. FIG. 4A illustrates user interface 402, which is displayed as part of an electronic messaging application (e.g., an email application). In this example, each row in the list represents a separate object. Examples of objects includes messages, (e.g., messages 404, 408, and 414-426), message clusters (e.g., 406, 410), and task 412. The objects are all for a user associated with the user interface 402. In some embodiments, individual messages (e.g., messages 404, 408, and 414-426) are message threads, message conversations, or messages that are addressed to one or more users, including the user uniquely associated with the user interface 402.

In FIG. 4A, the user interface 402 is, in particular, shown to comprise at least two objects that are message clusters, cluster 406 and cluster 410. Cluster 406 is a group of electronic messages having a collective association, namely promotional material (e.g., advertisements for retail sales, newsletters from stores). As can be seen in FIG. 4A, cluster 406 comprises nine new electronic messages, and cluster 410 comprises 1 new electronic message. In some embodiments, a new electronic message refers to a message that has not been viewed, opened, acknowledged or read by the user of the electronic messaging application. Message clusters are disclosed further in U.S. patent application Ser. No. 14/145,005, entitled "Systems and Methods for Throttling Display of Electronic Messages," filed Dec. 31, 2013, and U.S. patent application Ser. No. 14/139,205, entitled "Systems and Methods for Clustering Electronic Messages," filed Dec. 23, 2013, each of which is hereby incorporated by reference herein in its entirety.

Continuing to refer to FIG. 4A, a method of annotating a message is disclosed in more detail. A plurality of messages intended for a user is analyzed to determine whether a task reminder is derivable from respective messages in the plurality of messages through processing of the respective messages, thereby deriving task reminders for at least a subset of the plurality of messages. The user interface 402 for an electronic messaging 106 application is provided. The user interface 402 includes a list of objects. One or more respective object of the objects in the list of objects represents a collapsed state of a corresponding message in the subset of the plurality of messages. In particular, user interface 402 includes object 412 from one such message. Object 412 includes a message summary 428 for the corresponding message, the task reminder 430 derived from the corresponding message, and a dismissal affordance 434. In some embodiments, object 412 further includes a confirmation affordance 432.

In some embodiments, rather than simply providing a task reminder 430, potential (candidate) task assists are provided to the user. For example, in some embodiments one or more entities associated with the task reminder 430 are identified using at least the description of the task reminder 430 and, optionally, geographic information about the user. In some instances, an entity is deemed to be associated with a task reminder 430 when the entity is capable of performing an action identified in the task reminder 430 and the entity services such actions from users that are at or from the location identified in the geographical information associated with a user. Information for performing the action with at least one respective entity in the one or more entities based upon an identity of the entity is identified and formatted for use by the user. For example, a task reminder "renew drivers license" coupled with geographic information about the user (e.g., the user's home address or home GPS coordinates) is used to determine the correct department of motor vehicles website to suggest to the user. In one example, the user's geographic information identifies Daly City, Calif. and the Daly City office of the California Department of Motor Vehicles is identified as the information for performing the action of renewing a driver's license. In this example, the URL for the Daly City office of the California Department of Motor Vehicles is formatted for use by the user. In another example, the user's geographic information identifies Daly City, Calif. and the California URL for the California Department of Motor Vehicles is identified as the information 430 for performing the action of renewing a driver's license. In this example, the California URL for the California Department of Motor Vehicles is formatted for use by the user. In some embodiments, the task assist provides a URL, phone number, address, map, or other form of information for accomplishing the task. In some embodiments, the task is not associated with an entity but rather is an event or action unaffiliated with an entity. In one such example, the task reminder 430 is "study for math exam" and the task assist is a URL to the current chapter of a math reference that is to be reviewed in preparation for the math examination. In some embodiments, the task assist information is obtained from a source distinct from the plurality of messages intended for a user, for instance a public or private knowledge graph, the Internet, or other electronically accessible information sources.

In some embodiments, rather than simply providing a task reminder 430, one or more task postponement options are provided in accordance with some implementations. For instance, some implementations provide a "pick date & time" task postponement option which allows a user to specify a date and time after the present time in which to redisplay the task reminder 430. Some implementations provide a "pick place" option, which allows a user to designate a place when the task reminder 430 will reappear. Some implementations include predefined and/or user-defined place names, which may be correlated with GPS coordinates or other location identifiers. For example, a user may identify a "home" location, and when the user (e.g., the user's smart phone) reaches home, the message is displayed in the message list. In some implementations, a source distinct from the messages received by the user, such as a database at the server system 110, includes a table of predefined locations. The predefined locations may include single independent locations (e.g., the LAX airport), or a set of locations that are grouped together (e.g., a chain of sporting goods stores). When a "pick place" task postponement option is selected options are displayed to the user for selecting a location (e.g., a drop-down list). When a user accesses the messaging application from two or more devices, some implementations will display the postponed message when any of the devices are at the designated location (and the messaging application is running) In other implementations, postponing to a specific place considers only the current device that the user is accessing. Some implementations support an option to postpone task reminder 430 until the messaging application is being accessed from a specific device. Some implementations provide a "for duration" option, which allows the user to specify the amount of the delay rather than a specific time when the postponement expires. Some implementations include one or more postponement options that are pulled out of the task reminder 430, such as postponing until certain place specified in the task reminder is reached, or postponing until a certain location specified in the task reminder is reached.

In some embodiments, when a postponed task reminder 430 reappears it is in the form of an object that represents a collapsed state of a corresponding message in the subset of the plurality of messages such as object 412 of FIG. 4A. Object 412 includes a message summary 428 for the corresponding message, the task reminder 430 derived from the corresponding message and a dismissal affordance 434. In other embodiments, the redisplayed task reminder is displayed independently of any object that represents a particular message.

In some instances, the task reminder is inferred from the electronic message corresponding to the object. Ways to infer a task reminder from a message object are disclosed in U.S. patent application Ser. No. 14/161,368, entitled "Identifying Tasks in Messages," filed Jan. 22, 2014, which is hereby incorporated by reference herein in its entirety. In some embodiments a message is processed in order to determine whether the message includes a task reminder by determining, for each respective predefined candidate task reminder in a plurality of predefined task reminders, whether there is a match between the predefined candidate task reminder and all or a portion of the respective message. In some embodiments, this match between the predefined candidate task reminder and all or a portion of the respective message includes natural language processing of the all or a portion of the respective message as disclosed in U.S. patent application Ser. No. 14/161,368, entitled "Identifying Tasks in Messages," filed Jan. 22, 2014, which is hereby incorporated by reference herein in its entirety. In some embodiments, the plurality of predefined candidate task reminders is stored in database 122 of server system 110. In some embodiments, the plurality of predefined candidate task reminders is stored in application data 222 (as candidate task reminders 228) on the client device 102 of a user. In some embodiments, each predefined candidate task is a rule, heuristic, phrase, or other expression that is matched or applied against messages intended for a user to see if there is a match between the predefined candidate task and all or a portion of the message. In some embodiments, a predefined candidate task reminder is provided by a user. In this way, the user can influence the format and types of task reminders that are generated for the user when messages are received. In some embodiments, a predefined candidate task reminder in the plurality of candidate task reminders is from a source other than (external to, independent of) the user. For instance, in some embodiments there is a library of standard or common predefined candidate task reminder formats that are provided for matching. In some embodiments the plurality of predefined candidate task reminders includes some predefined candidate task reminders provided by the user and some predefined candidate task reminders from a source independent of the user. When a match is deemed to have been found, the object corresponding to the message that had a match is updated to include the candidate task reminder derived from the corresponding message. Thus, in the case of FIG. 4A, the task reminder "Don't forget to take the trash out" is a task reminder that was derived from a corresponding message.

Figure 4B:
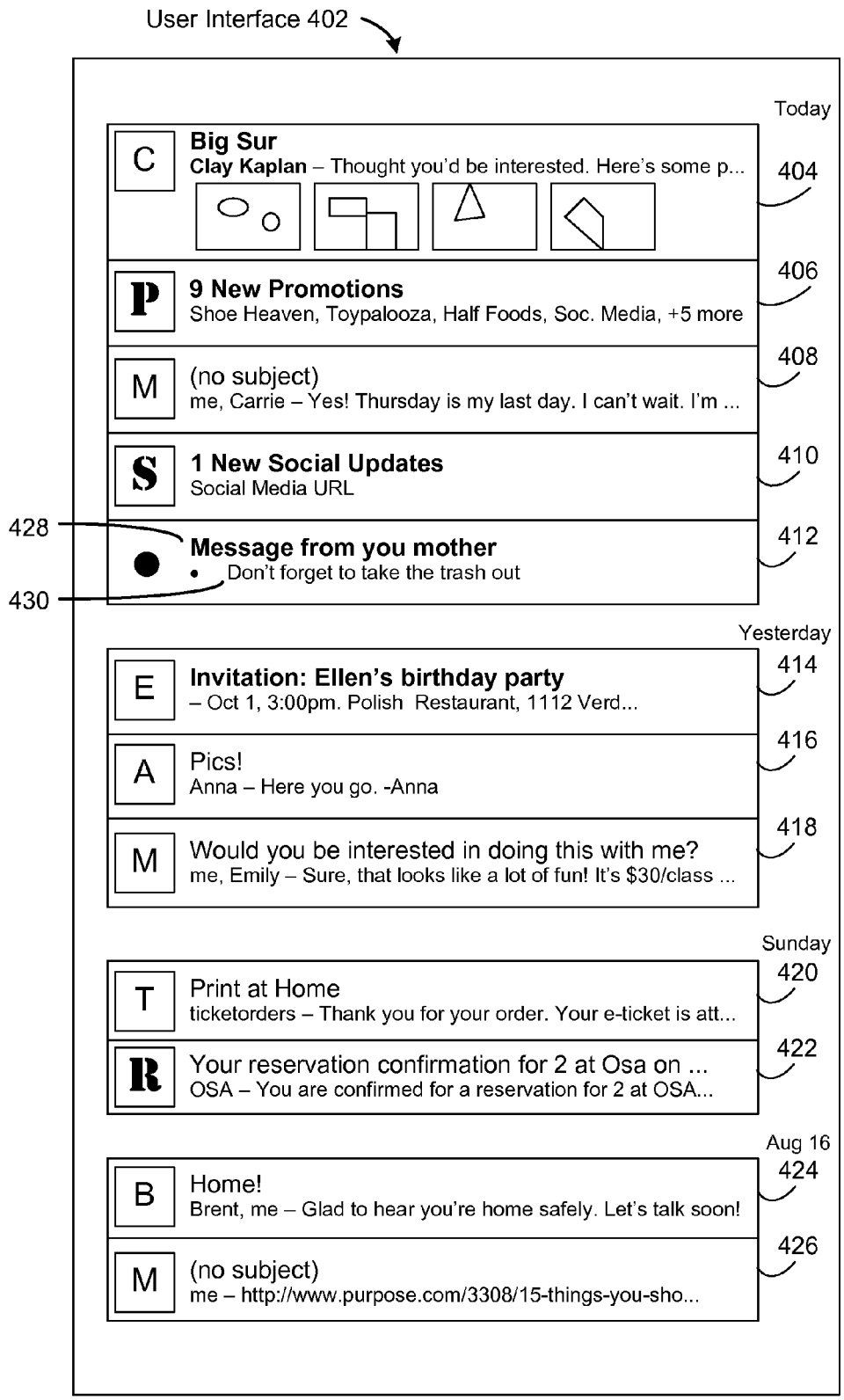
Figure 4C:
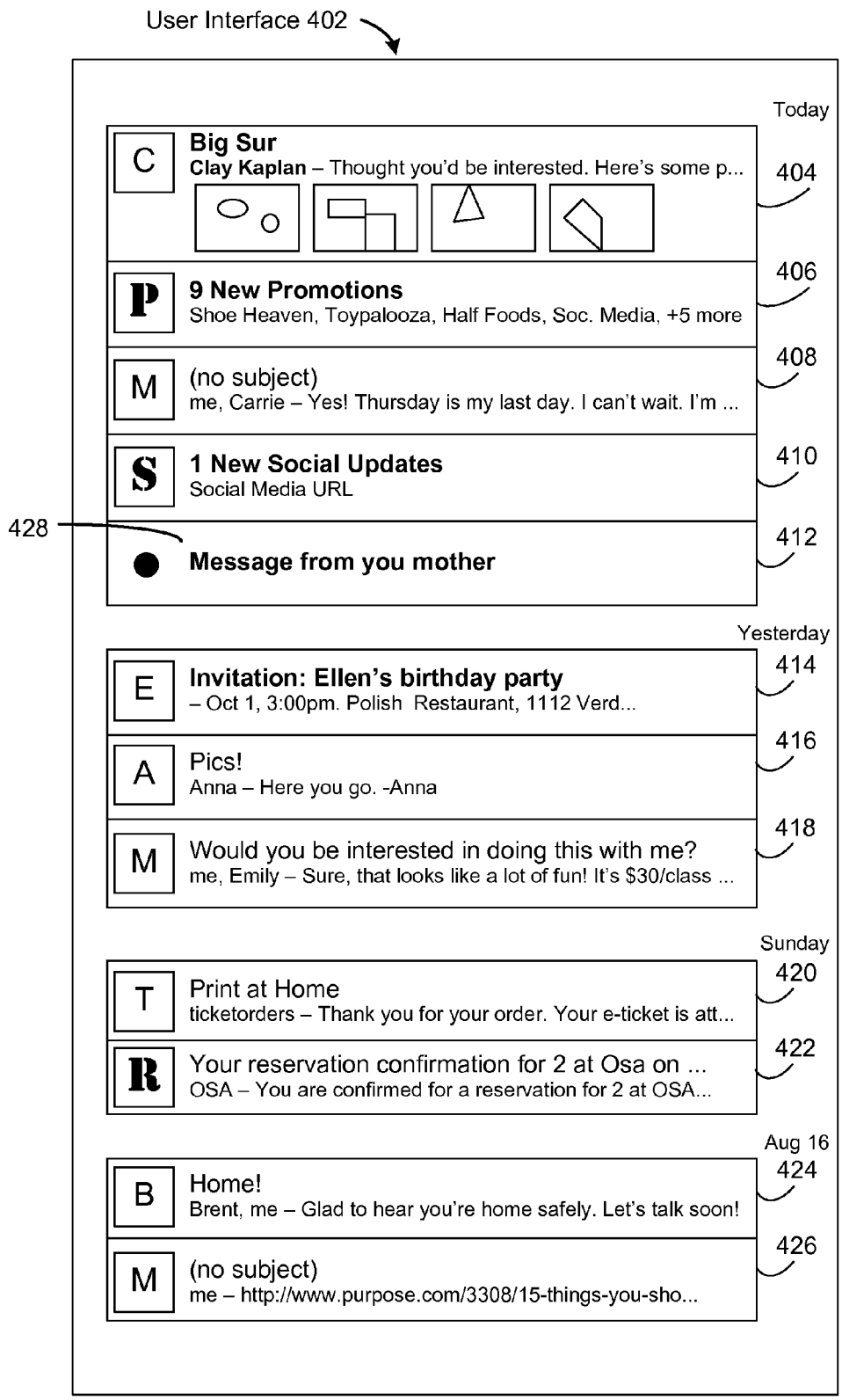

At this stage, it will be appreciated that the object 412 includes a task reminder 430 derived from a message, without human intervention. Thus the user (the recipient of the corresponding message) has not yet confirmed that the task reminder 430 is necessary, wanted or relevant. It is for this reason that one or more affordances are provided. In some embodiments, if the user wants to keep the message, the optional confirmation affordance 432 is selected. In some embodiments, a confirmation affordance 432 is not provided. If the user does not want to keep the message, the dismissal affordance 434 is selected. Specifically, in those embodiments that do have a confirmation affordance 432, responsive to user selection of the confirmation affordance 432, the confirmation affordance 432 and the dismissal affordance 434 are removed from the respective object as illustrated in FIG. 4B. Alternatively, responsive to user selection of the dismissal affordance 434, the task reminder 430, the confirmation affordance 432 (if present), and the dismissal affordance 434 are all removed from object 412 as illustrated in FIG. 4C.

Referring back to FIG. 4A, confirmation affordance 434 and dismissal affordance 432 are seen to occupy different portions of the respective object 412. That is, they are discrete and different affordances. However, in other embodiments, the confirmation affordance and the dismissal affordance are different states of a single affordance that occupies a single portion of the respective object. For example, a two-state radio button, switch or other type of affordance that allows the user to either accept or reject the task reminder 430. In still other embodiments, there are three affordances provided: accept, dismiss, and edit. In some such instances, each of these three affordances occupies a different portion of the object. In other such instances, one or more of these options is built into a multi-state object that allows the user to select one of the options.

Figure 4D:
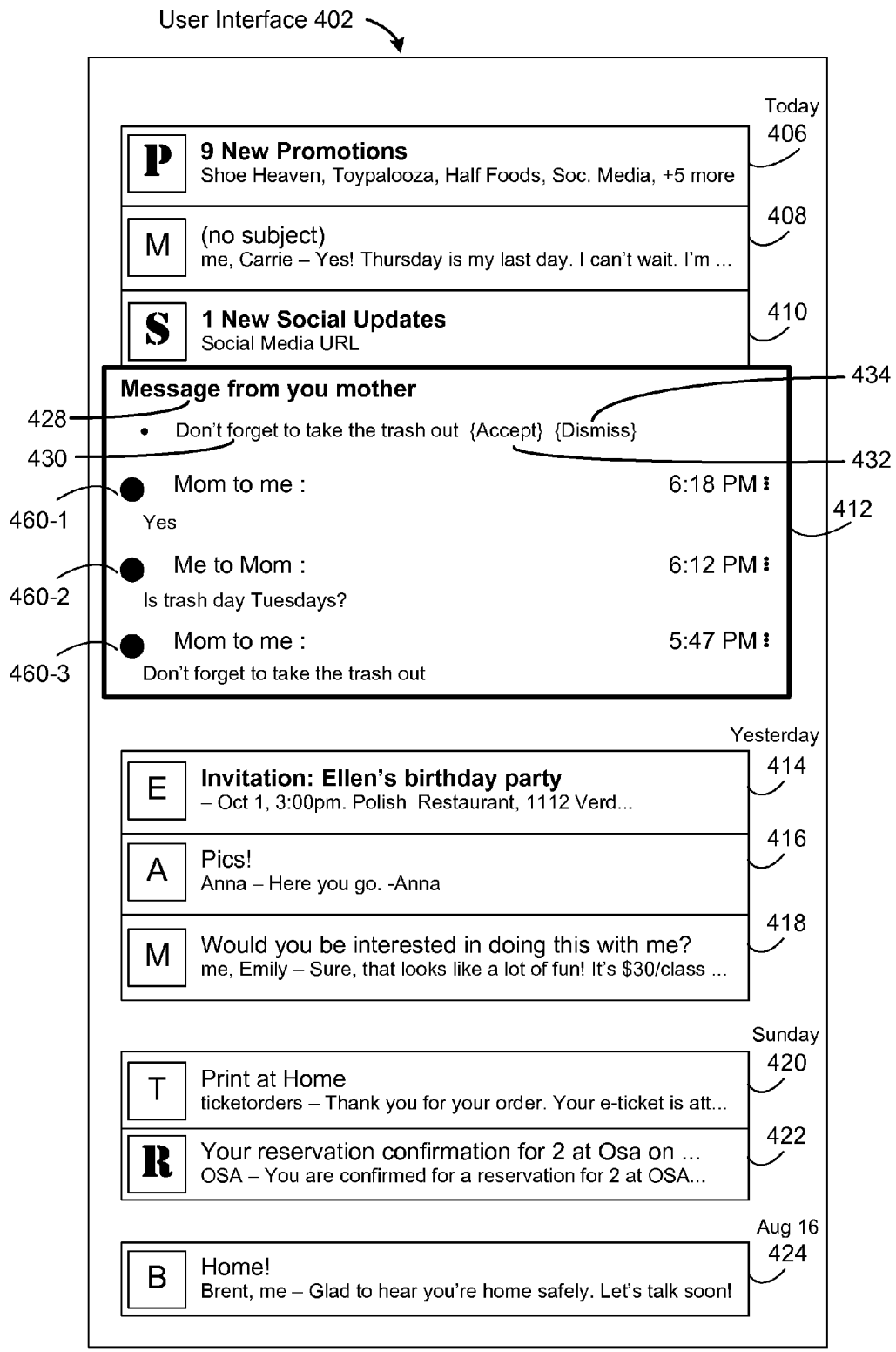
Figure 4E:
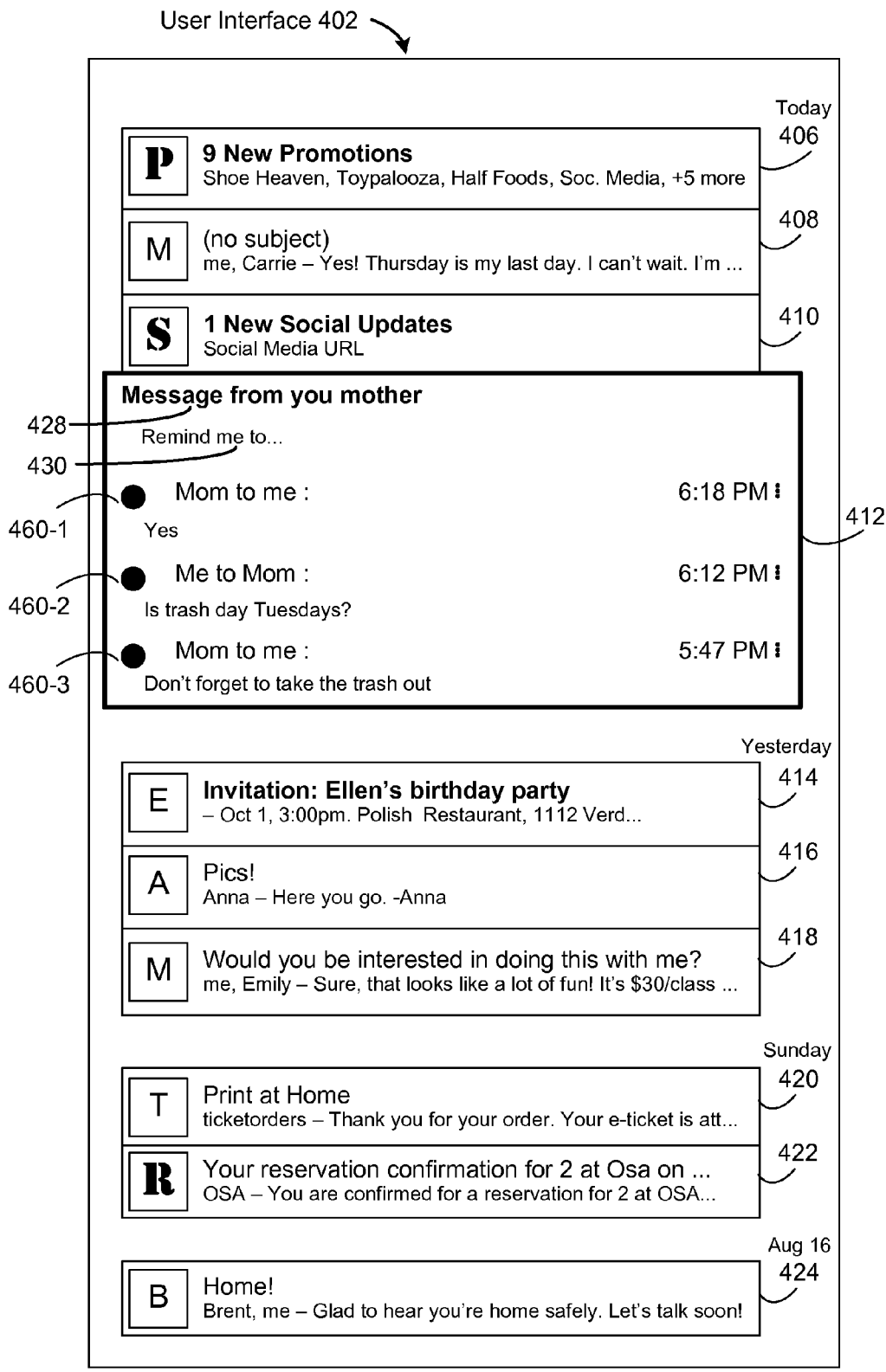
Figure 4F:
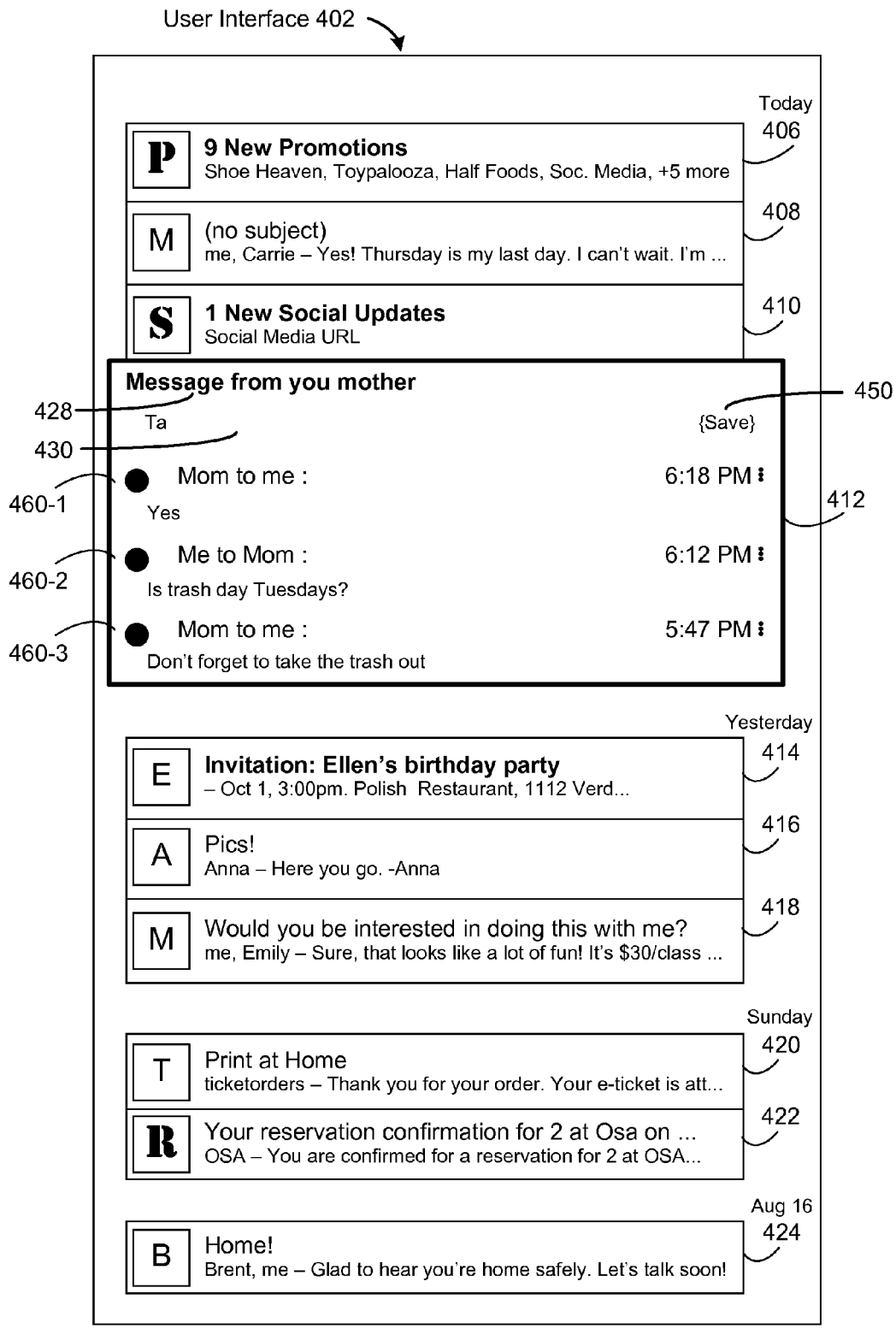
Figure 4G:
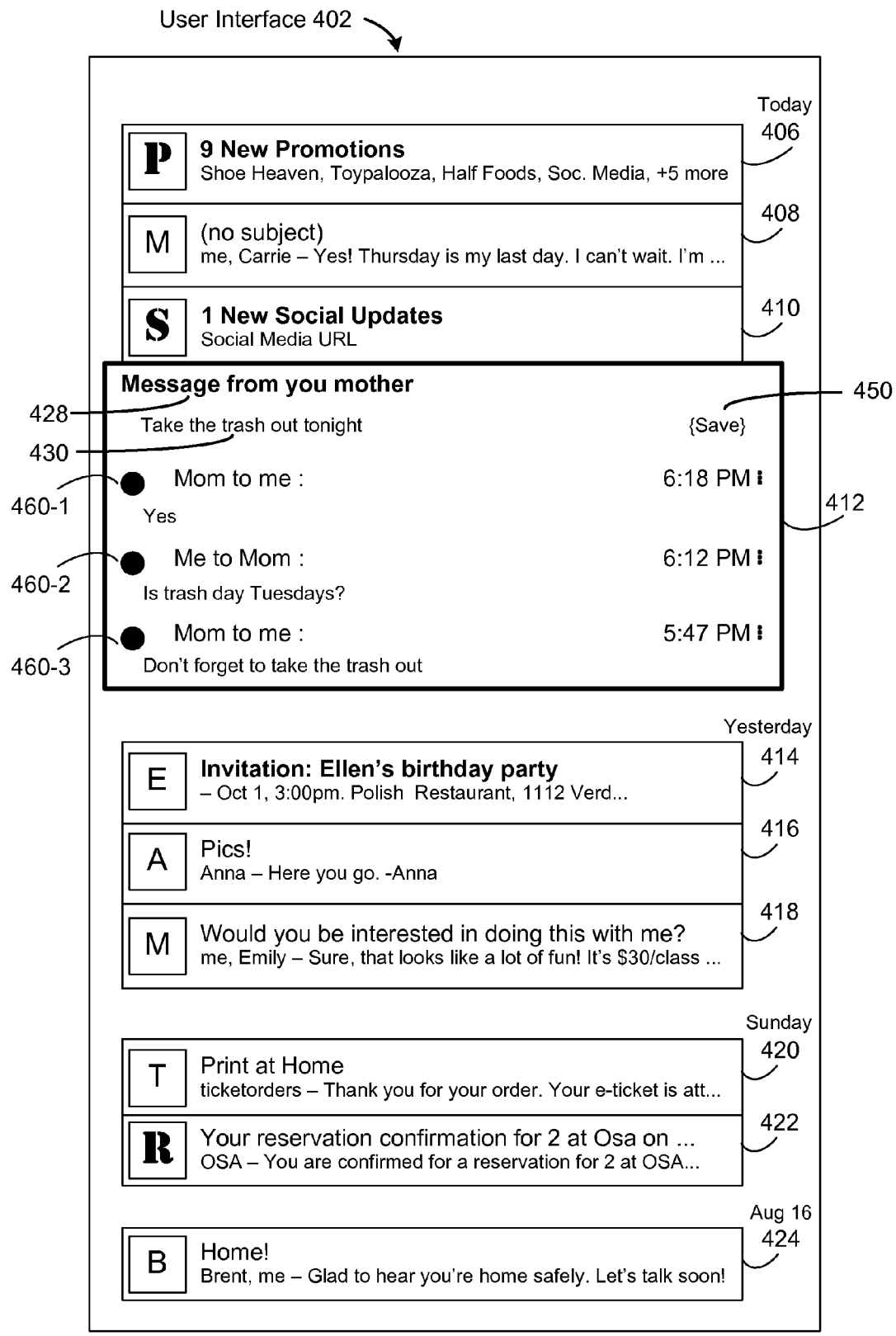

Advantageously with reference to FIG. 4D, in some embodiments, user interface 402 facilitates user editing of task reminders. This is beneficial for task reminders generated without human intervention using the methods of the present disclosure. In some embodiments, the use case of FIG. 4D in which the task reminder is editable, is reached by selection of the task reminder 430 illustrated in FIG. 4A. In some embodiments it is reached by selection of message summary 428 of FIG. 4A. In some embodiments it is reached by selection of anywhere within object 412 other than affordances 432 and 434 of FIG. 4A. In some embodiments it is reached by selection of a designated "edit" affordance that is not shown in FIG. 4A.

Turning to FIG. 4D it is seen that, responsive to user selection of a task reminder of an object in the list of objects, for example by any of the ways described above, the collapsed state of the message corresponding to the object is replaced with an expanded state of the corresponding message by pushing any objects in the list of objects that are above the object 412 representing the corresponding message (e.g., objects 404, 406, 408, and 410) up and pushing any objects in the list of objects that are below the object 412 representing the corresponding message (e.g., objects 414, 416, 418, 420, 422, 424, and 426) down. User edits to the task reminder are then facilitated. FIG. 4D further illustrates how, in some embodiments, the message corresponding to an object is part of a chain of messages 460 and the expanded state of the message includes the chain of messages.

Figure 4H:
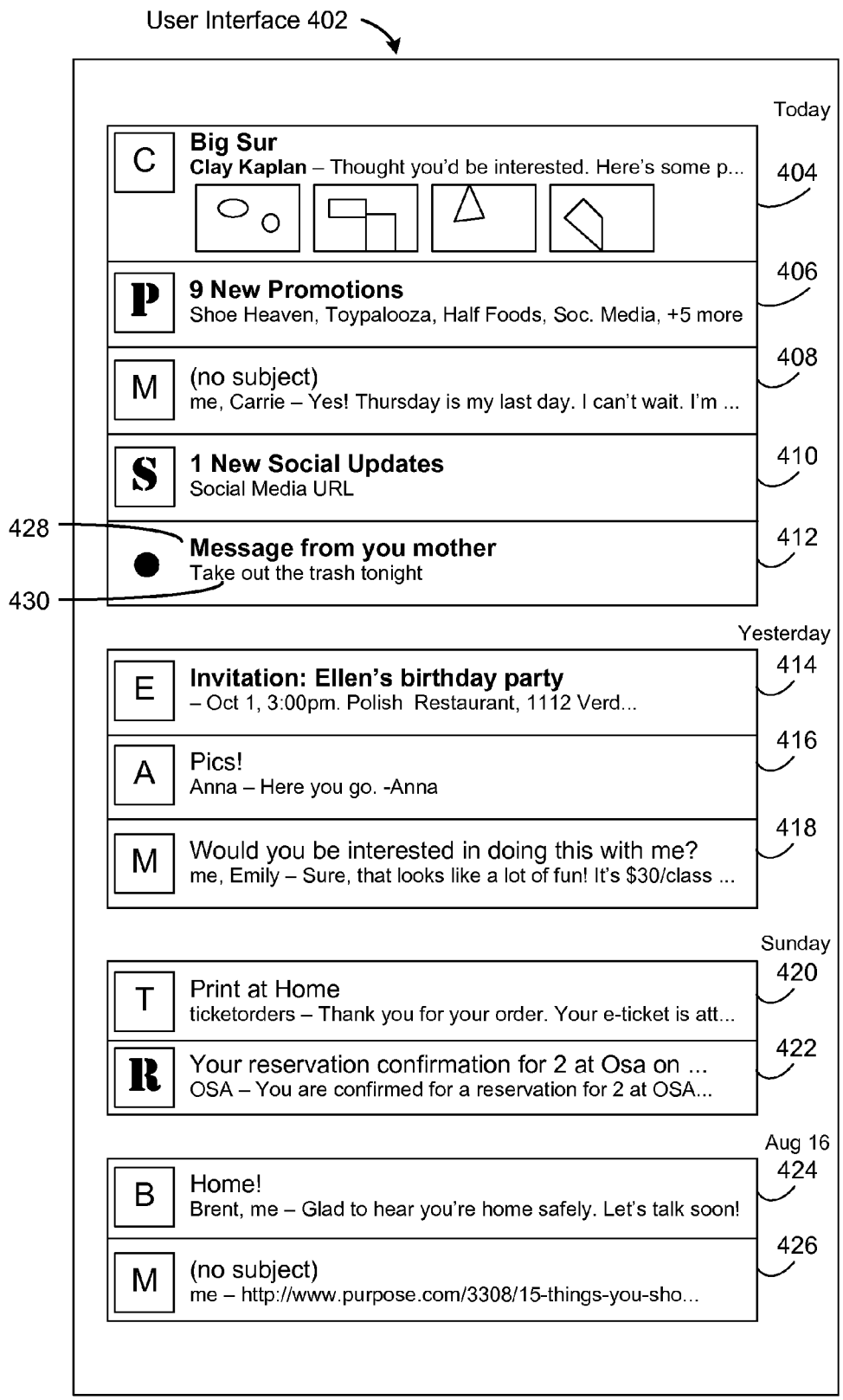

In some embodiments, as illustrated in FIG. 4D, when the user begins to edit the task reminder, the optional confirmation 432 (if present) and dismissal 434 affordances are removed. In some embodiments, turning to FIG. 4E, when the user selects suggested task reminder editing as described above, the suggested task reminder 430 is repopulated with a generic task reminder such as "Remind me to . . . ". In some embodiments, turning to FIGS. 4F and 4G, when the user types a task reminder, the generic task reminder is removed and replaced with the task reminder provided by the user. As further illustrated in FIGS. 4F and 4G, a save affordance 450 is provided when the user edits the task reminder 430. Referring to FIG. 4H, responsive to user selection of the save affordance the expanded state of the corresponding message is replaced with the original collapsed state of the corresponding message by pushing any objects in the list of objects that are above the object representing the message (e.g., objects 404, 406, 408, and 410) down and pushing any objects in the list of objects that are below the object representing the message (e.g., objects 414, 416, 418, 420, 422, 424, and 426) up in the user interface and removing the save affordance 450, thereby creating a task.

Referring once again to FIG. 4D, the illustrated task reminder 430 is an instance where the task reminder is exclusively taken from the respective message. There, the message is a message chain and text of message 460-3 includes the phrase "Don't forget to take the trash out" which is used exclusively to form the task reminder 430. In other embodiments, the task reminder 430 includes one or more words that are taken from a source independent of the respective message and one or more words that are taken from the respective message. In other words, in some embodiments, in generating a task reminder 430 from a corresponding message without human intervention, some of the words of the task reminder 430 are from the corresponding message and some of the words are from a source independent of the respective messages. In one such example, words from the respective reminder are reformatted into a standard expression, for instance "Don't forget to take the trash out" is reformatted to "Reminder—take the trash out." Here the word "reminder" is taken from a task reminder formatting rule, which is an example of a source independent of the respective message. Additional examples of sources independent of the respective message include inserting current or future dates into the task reminder, inserting locations, places of business, opening and closing times of entities referenced by the corresponding message, and current flight and arrival times. For instance, consider the case where a user receives a message "I am arriving on flight 10493, please pick me up." Responsive to this message, the current arrival time of flight 10493 is determined from a source independent of the respective message and the original message is annotated to include the task reminder "Pick Mom up at 9:00 PM (flight arrives at 8:45 PM)" which the user may then accept, edit, or decline as described in the present disclosure.

Referring to FIG. 2, a display device 208 is inherently limited in size. Accordingly, the number of objects displayed in the user interface 402 is necessarily limited. Scrolling may be necessary for a user to get to a desired message. If the number of messages in the message list is small enough, all of the messages may be able to be displayed.

Figure 5A:
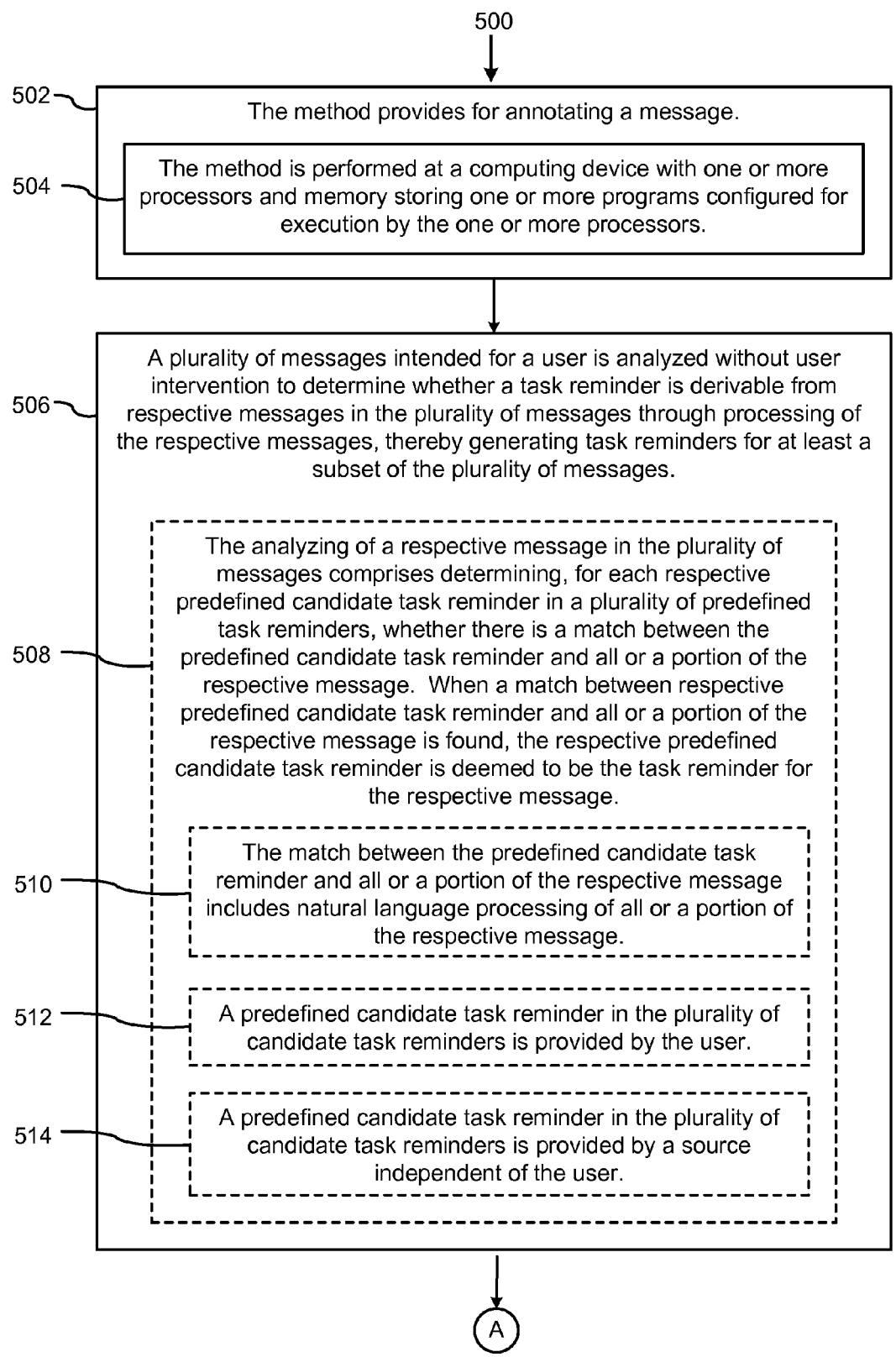
FIGS. 5A-5C provide a flowchart of a process for annotating a message according to some implementations.
Figure 5B:
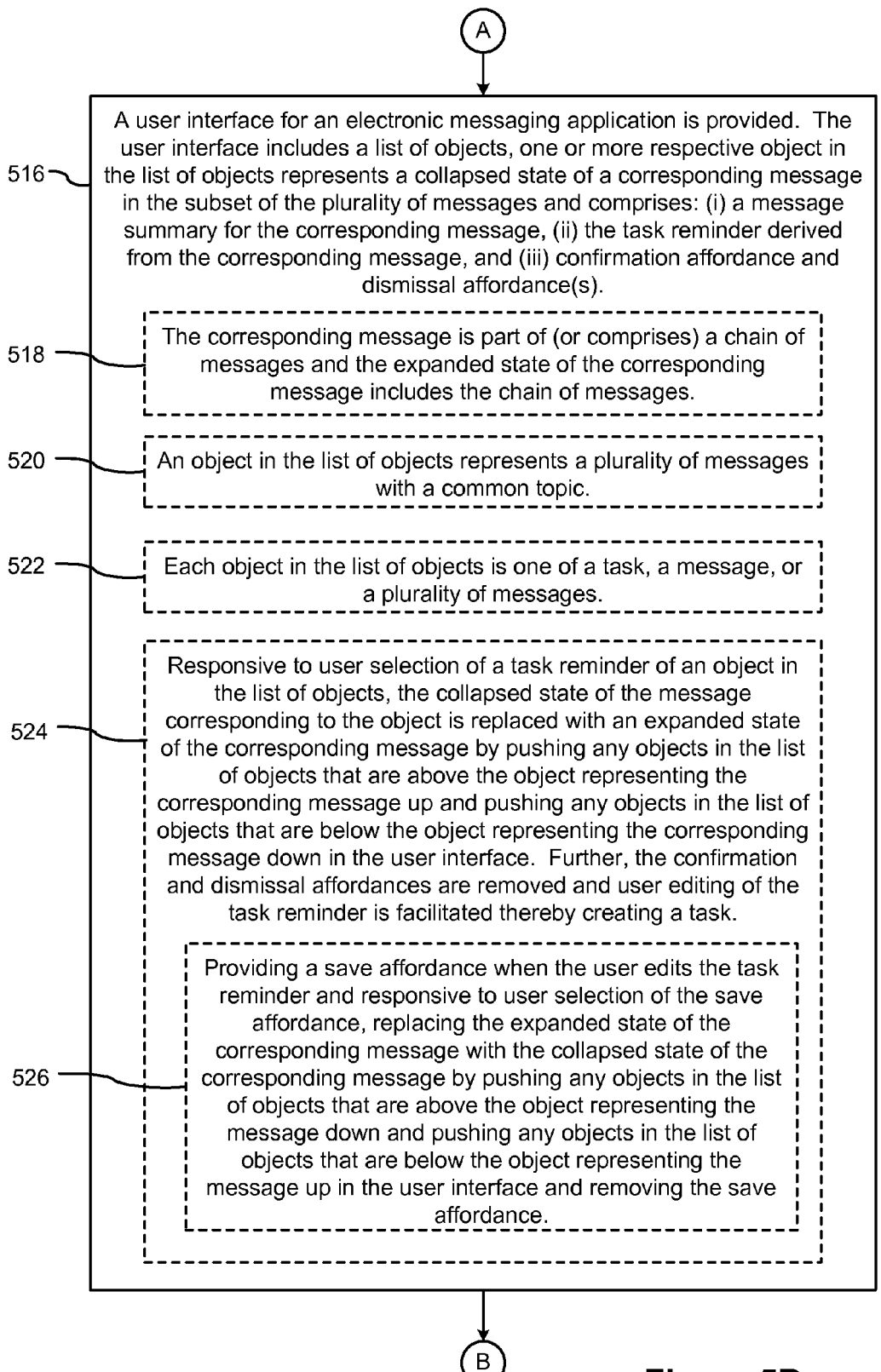
Figure 5C:
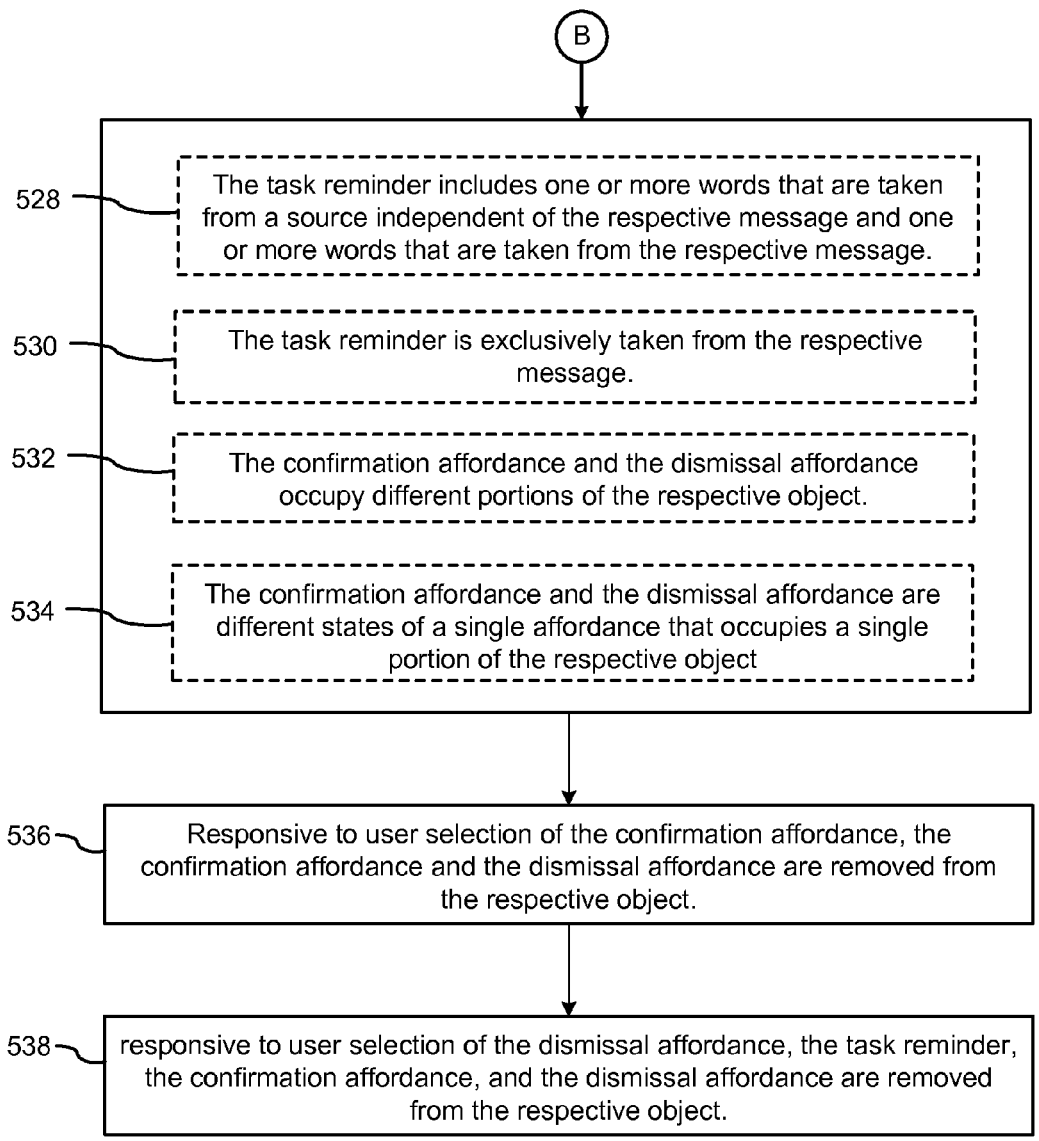

FIGS. 5A-5C provide a flowchart of a process 500, performed by a computing device, for annotating a message (502). The method is performed (504) at a computing device 102 and/or 110 having one or more processors and memory. The memory stores (504) one or more programs configured for execution by the one or more processors.

A plurality of messages intended for a user is analyzed to determine whether a task reminder is derivable from respective messages in the plurality of messages through processing of the respective messages (506). In this way task reminders for at least a subset of the plurality of messages are generated (506). In some embodiments, each of the messages is for one or more recipients and each of the messages include the user as a common recipient. In some embodiments, some or all of the messages in the plurality of messages are sent at different times to the user.

In some embodiments, the analyzing of a respective message in the plurality of messages comprises determining, for each respective predefined candidate task reminder in a plurality of predefined task reminders, whether there is a match between the predefined candidate task reminder and all or a portion of the respective message, where when a match between respective predefined candidate task reminder and all or a portion of the respective message is found, the respective predefined candidate task reminder is deemed to be the task reminder for the respective message (508). In some embodiments, the match between the predefined candidate task reminder and all or a portion of the respective message includes natural language processing of all or a portion of the respective message (510). In some embodiments, a predefined candidate task reminder in the plurality of candidate task reminders is provided by the user (512). In some embodiments, a predefined candidate task reminder in the plurality of candidate task reminders is provided by a source independent of the user (514).

A user interface for an electronic messaging application is provided (508). The user interface includes a list of objects. One or more respective object of the objects in the list of objects represents a collapsed state of a corresponding message in the subset of the plurality of messages and comprises: (i) a message summary for the corresponding message, (ii) the task reminder derived from the corresponding message, and a dismissal affordance (516) In some embodiments the collapsed state further comprises a confirmation affordance. In some embodiments, the corresponding message is part of or comprises a chain of messages and the expanded state of the corresponding message includes the chain of messages (518).

In some embodiments, an object in the list of objects represents a plurality of messages with a common topic (520). For example, in some embodiments an object represents a cluster of messages, and the cluster of messages comprises a plurality of messages sharing a common set of characteristics that meet a first predefined criterion (e.g., clustering criterion) and the plurality of messages are sent at different times covering the same topic and each having the user as a common recipient.

In some embodiments, each object in the list of objects is one of a task, a message, or a plurality of messages (e.g., a cluster of messages or a conversation) (522). In some embodiments, some objects in the list of objects are one of a task, a message, or a plurality of messages (e.g., a cluster of messages or a conversation), and there are other types of objects in the list as well.

In some embodiments, the method further comprises, responsive to user selection of a task reminder of an object in the list of objects, replacing the collapsed state of the message corresponding to the object with an expanded state of the corresponding message by pushing any objects in the list of objects that are above the object representing the corresponding message up and pushing any objects in the list of objects that are below the object representing the corresponding message down in the user interface. Further, the confirmation affordance (if present) and the dismissal affordance are removed and user editing of the task reminder is facilitated thereby creating a task (524). In some embodiments, the method further comprises providing a save affordance when the user edits the task reminder and responsive to user selection of the save affordance, replacing the expanded state of the corresponding message with the collapsed state of the corresponding message by pushing any objects in the list of objects that are above the object representing the message down and pushing any objects in the list of objects that are below the object representing the message up in the user interface and removing the save affordance (526).

In some embodiments, the task reminder that is generated (e.g., without user edits) includes one or more words that are taken from a source independent of the respective message and one or more words that are taken from the respective message (528). In some embodiments, the task reminder is exclusively taken from the respective message (530).

In some embodiments that include a confirmation affordance, the confirmation affordance and the dismissal affordance occupy different portions of the respective object (532). In some embodiments, the confirmation affordance and the dismissal affordance are different states of a single affordance that occupies a single portion of the respective object (534). In some embodiments, there is no confirmation affordance.

In the method, in embodiments that include the confirmation affordance, responsive to user selection of the confirmation affordance, the confirmation and dismissal affordance(s) are removed from the respective object (536). Furthermore, responsive to user selection of the dismissal affordance, the task reminder, the confirmation affordance (if present), and the dismissal affordance are removed from the respective object (538).

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations described herein were chosen and described in order to best explain the principles of the invention and its practical applications, to thereby enable others skilled in the art to best utilize the invention and various implementations with various modifications as are suited to the particular use contemplated.

What is claimed is:

1. A method of annotating a message, comprising:
   at a computing device having one or more processors and memory storing one or more programs configured for execution by the one or more processors:

displaying, by the computing device, a user interface for an electronic messaging application, wherein the user interface includes a list of objects representing a plurality of electronic messages intended for a user, including a first object representing a collapsed state of a first message, and wherein the collapsed state of the first message contains a message summary of the first message;

analyzing, by the computing device, content of the first message to determine whether a task reminder is derivable from the first message;

in response to determining that a task reminder is derivable from the first message:

generating, by the computing device, a suggested task reminder for the first message;

updating, by the computing device, the display of the collapsed state of the first message to contain: (i) the message summary, (ii) the suggested task reminder, (iii) a dismissal affordance, and (iv) a confirmation affordance;

when the dismissal affordance is selected by the user, removing, by the computing device, the suggested task reminder, the confirmation affordance, and the dismissal affordance from the display of the collapsed state of the first message; and when the confirmation affordance is selected by the user:

storing, by the computing device, the suggested task reminder as a confirmed task reminder in the memory; and subsequently presenting the confirmed task reminder to the user in accordance with a time associated with the confirmed task reminder.

2. The method of claim 1, further comprising:
responsive to user selection of the suggested task reminder:
replacing the collapsed state of the first message with an expanded state of the first message by pushing any objects in the list of objects that are above the first object representing the corresponding message up and pushing any objects in the list of objects that are below the first object down in the user interface;
removing the dismissal affordance; and
facilitating user edits to the suggested task reminder.

3. The method of claim 2, further comprising:
providing a save affordance when the user edits the suggested task reminder; and
responsive to user selection of the save affordance:
storing the suggested task reminder as a confirmed task reminder in the memory;
replacing the expanded state of the first message with the collapsed state of the first message by pushing any objects in the list of objects that are above the first object down and pushing any objects in the list of objects that are below the first object up in the user interface; and
removing the save affordance.

4. The method of claim 2, wherein the first message is part of a chain of messages and the expanded state of the corresponding message includes the chain of messages.

5. The method of claim 1, wherein an object in the list of objects represents a plurality of messages with a common topic.

6. The method of claim 1, wherein each object in the list of objects is one of a task, a message, or a plurality of messages.

7. The method of claim 1 wherein the suggested task reminder includes one or more words that are taken from a source independent of the first message and one or more words that are taken from the first message.

8. The method of claim 1 wherein the suggested task reminder is exclusively taken from the first message.

9. The method of claim 1, wherein the confirmation affordance and the dismissal affordance occupy different portions of the first object, the method further comprising:
responsive to user selection of the confirmation affordance, removing the confirmation affordance and the dismissal affordance from the first object.

10. The method of claim 1, wherein analyzing the content of the first comprises:
determining, for each predefined candidate task reminder in a plurality of predefined task reminders, whether there is a match between the respective predefined candidate task reminder and all or a portion of the content; wherein
when a match between the respective predefined candidate task reminder and all or a portion of the first message is found, the respective predefined candidate task reminder is deemed to be the suggested task reminder for the first message.

11. The method of claim 10, wherein the match between the respective predefined candidate task reminder and all or a portion of the first message includes natural language processing of all or a portion of the respective message.

12. The method of claim 10, wherein a predefined candidate task reminder in the plurality of candidate task reminders is provided by the user.

13. The method of claim 10, wherein a predefined candidate task reminder in the plurality of candidate task reminders is provided by a source independent of the user.

14. The method of claim 1, further comprising:
determining a task assist based at least upon the suggested task reminder, and wherein the collapsed state of the first message further comprises the task assist.

15. The method of claim 14, wherein the task assist is a phone number, URL, address, or map location associated with the suggested task reminder, and wherein the task assist is obtained from a source distinct from the content of the first message.

16. A computing device, comprising:
one or more processors;
memory; and
one or more programs stored in the memory configured for execution by the one or more processors, the one or more programs comprising instructions for:
displaying, by the computing device, a user interface for an electronic messaging application, wherein the user interface includes a list of objects representing a plurality of electronic messages intended for a user, including a first object representing a collapsed state of a first message, and wherein the collapsed state of the first message contains a message summary of the first message;
analyzing, by the computing device, content of the first message to determine whether a task reminder is derivable from the first message;
in response to determining that a task reminder is derivable from the first message:
generating, by the computing device, a suggested task reminder for the first message;
updating, by the computing device, the display of the collapsed state of the first message to contain: (i) the message summary, (ii) the suggested task reminder, (iii) a dismissal affordance, and (iv) a confirmation affordance;

when the dismissal affordance is selected by the user, removing, by the computing device, the suggested task reminder, the confirmation affordance, and the dismissal affordance from the display of the collapsed state of the first message; and when the confirmation affordance is selected by the user:

storing, by the computing device, the suggested task reminder as a confirmed task reminder in the memory; and subsequently presenting the confirmed task reminder to the user in accordance with a time associated with the confirmed task reminder.

17. The computing device of claim 16, wherein the one or more programs further comprise instructions for:

responsive to user selection of the suggested task reminder:

replacing the collapsed state of the first message with an expanded state of the first message by pushing any objects in the list of objects that are above the first object representing the corresponding message up and pushing any objects in the list of objects that are below the first object down in the user interface;

removing the dismissal affordance; and facilitating user edits to the suggested task reminder.

18. The computing device of claim 17, wherein the one or more programs further comprise instructions for providing a save affordance when the user edits the suggested task reminder, wherein:

responsive to user selection of the save affordance, storing the suggested task reminder as a confirmed task reminder in the memory;

replacing the expanded state of the first message with the collapsed state of the first message by pushing any objects in the list of objects that are above the first object down and pushing any objects in the list of objects that are below the first object up in the user interface; and removing the save affordance.

19. The computing device of claim 17, wherein the first message is part of a chain of messages and the expanded state of the message includes the chain of messages.

20. The computing device of claim 16, wherein an object in the list of objects represents a plurality of messages with a common topic.

21. A non-transitory computer readable storage medium storing one or more programs configured for execution by a computing device having one or more processors and memory, the one or more programs comprising instructions for:

displaying, by the computing device, a user interface for an electronic messaging application, wherein the user interface includes a list of objects representing a plurality of electronic messages intended for a user, including a first object representing a collapsed state of a first message, and wherein the collapsed state of the first message contains a message summary of the first message;

analyzing, by the computing device, content of the first message to determine whether a task reminder is derivable from the first message;

in response to determining that a task reminder is derivable from the first message:

generating, by the computing device, a suggested task reminder for the first message;

updating, by the computing device, the display of the collapsed state of the first message to contain: (i) the message summary, (ii) the suggested task reminder, (iii) a dismissal affordance, and (iv) a confirmation affordance;

when the dismissal affordance is selected by the user, removing, by the computing device, the suggested task reminder, the confirmation affordance, and the dismissal affordance from the display of the collapsed state of the first message; and when the confirmation affordance is selected by the user:

storing, by the computing device, the suggested task reminder as a confirmed task reminder in the memory; and subsequently presenting the confirmed task reminder to the user in accordance with a time associated with the confirmed task reminder.

* * * * *